United States Patent
Hansen et al.

(10) Patent No.: US 10,671,107 B2
(45) Date of Patent: Jun. 2, 2020

(54) PROJECTING TERMINAL POWER SUPPLY

(71) Applicant: Vivint, Inc., Provo, UT (US)

(72) Inventors: Greg Lee Hansen, Herriman, UT (US); Stephen Edward Boynton, Pleasant Grove, UT (US); Matthew Mahar, South Jordan, UT (US)

(73) Assignee: Vivint, Inc., Provo, UT (US)

( * ) Notice: Subject to any disclaimer, the term of this patent is extended or adjusted under 35 U.S.C. 154(b) by 400 days.

(21) Appl. No.: 15/040,643

(22) Filed: Feb. 10, 2016

(65) Prior Publication Data

US 2017/0227977 A1    Aug. 10, 2017

(51) Int. Cl.
  *G05B 15/02*    (2006.01)
  *G05F 1/66*    (2006.01)

(52) U.S. Cl.
  CPC ............. *G05F 1/66* (2013.01); *G05B 15/02* (2013.01)

(58) Field of Classification Search
  CPC .................................. G05F 1/66; G05B 15/02
  USPC ......................................................... 700/275
  See application file for complete search history.

(56) References Cited

U.S. PATENT DOCUMENTS

| | | | |
|---|---|---|---|
| 3,403,366 A | 9/1968 | Klatte et al. | |
| 4,652,069 A | 3/1987 | Smith | |
| 7,210,949 B2 | 5/2007 | Duncan et al. | |
| 8,734,181 B1* | 5/2014 | Waggoner | H01R 13/72 439/501 |
| 8,802,991 B1* | 8/2014 | Hua | H01R 13/72 174/133 R |
| 2003/0008550 A1* | 1/2003 | Tse | H01R 13/72 439/501 |
| 2006/0190739 A1* | 8/2006 | Soffer | G06F 21/71 713/189 |
| 2014/0094044 A1* | 4/2014 | Ward | H01R 13/6395 439/92 |
| 2014/0242830 A1 | 8/2014 | Garofalo et al. | |
| 2014/0322959 A1 | 10/2014 | Garofalo et al. | |

* cited by examiner

*Primary Examiner* — Huan Hoang
*Assistant Examiner* — Muna A Techane
(74) *Attorney, Agent, or Firm* — Holland & Hart, LLP

(57) ABSTRACT

An assembly, method, apparatus, and system for supplying power to security, life safety, information technology, and/or automation system components is disclosed. Some embodiments may include a power supply with a projecting terminal and a cable having a first end with an electrical contact surface for contacting a power transmitting surface of the projecting terminal to establish an electrical connection, so that a first end housing portion surrounds the electrical contact surface and at least partially covers the projecting terminal. The electrical contact surface may be adjustable using a spring, which may also assist in maintaining contact with the power transmitting surface located at the projecting terminal distal end. A cable second end may connect with an electronic device, and may be customizable according to the electronic device. Embodiments may also include keying features for ensuring connection with appropriate power supplies.

19 Claims, 9 Drawing Sheets

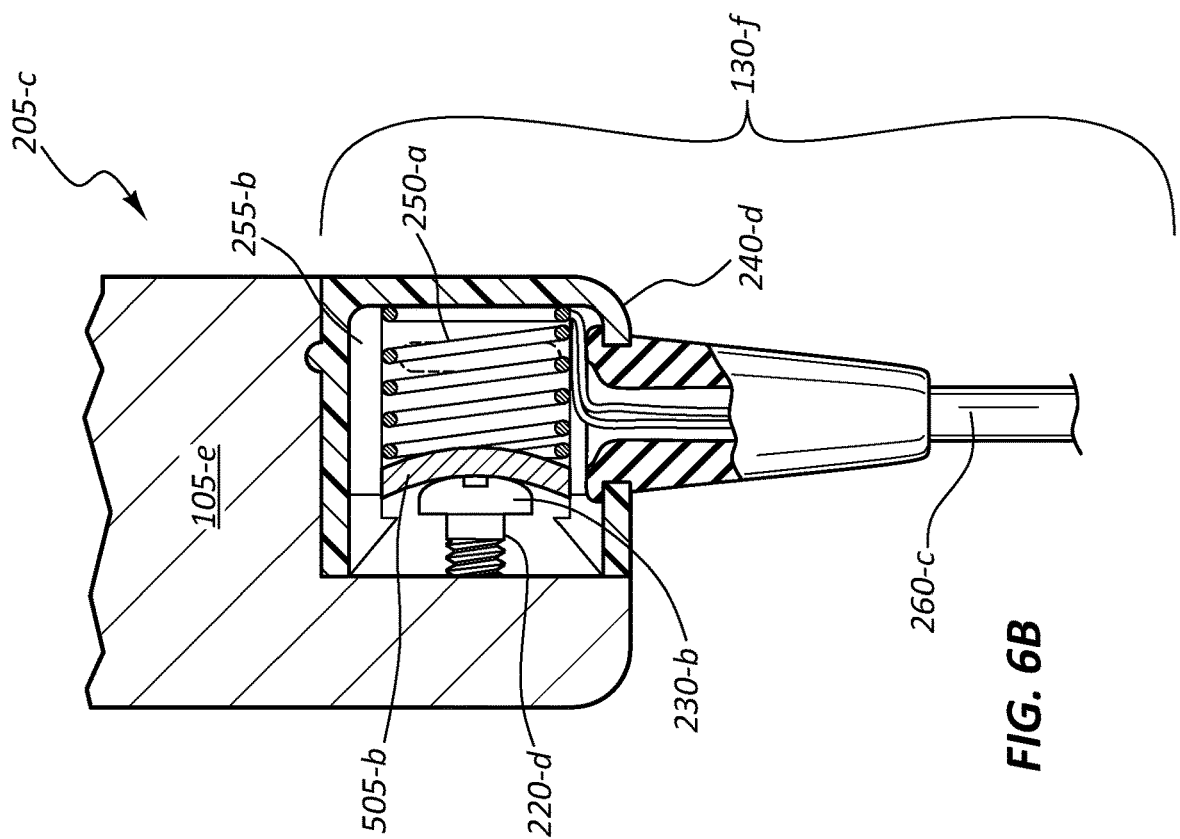
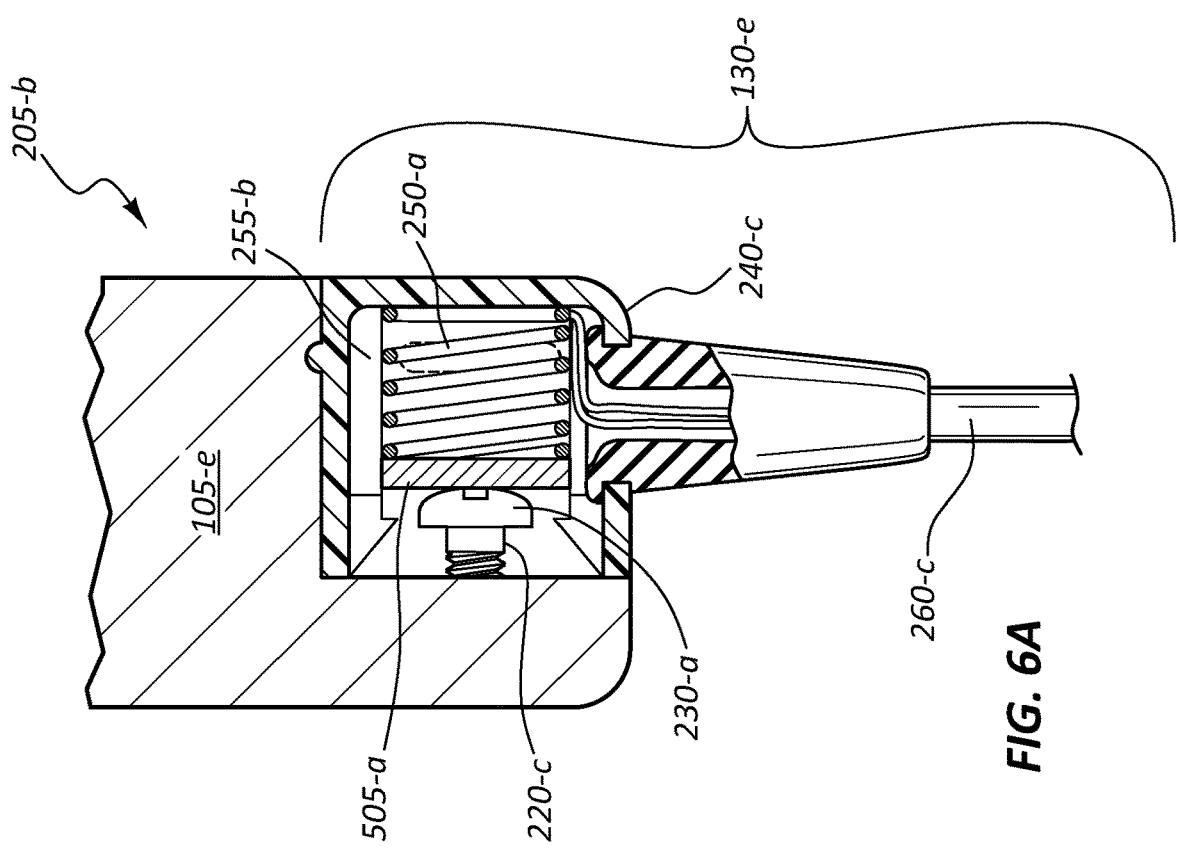

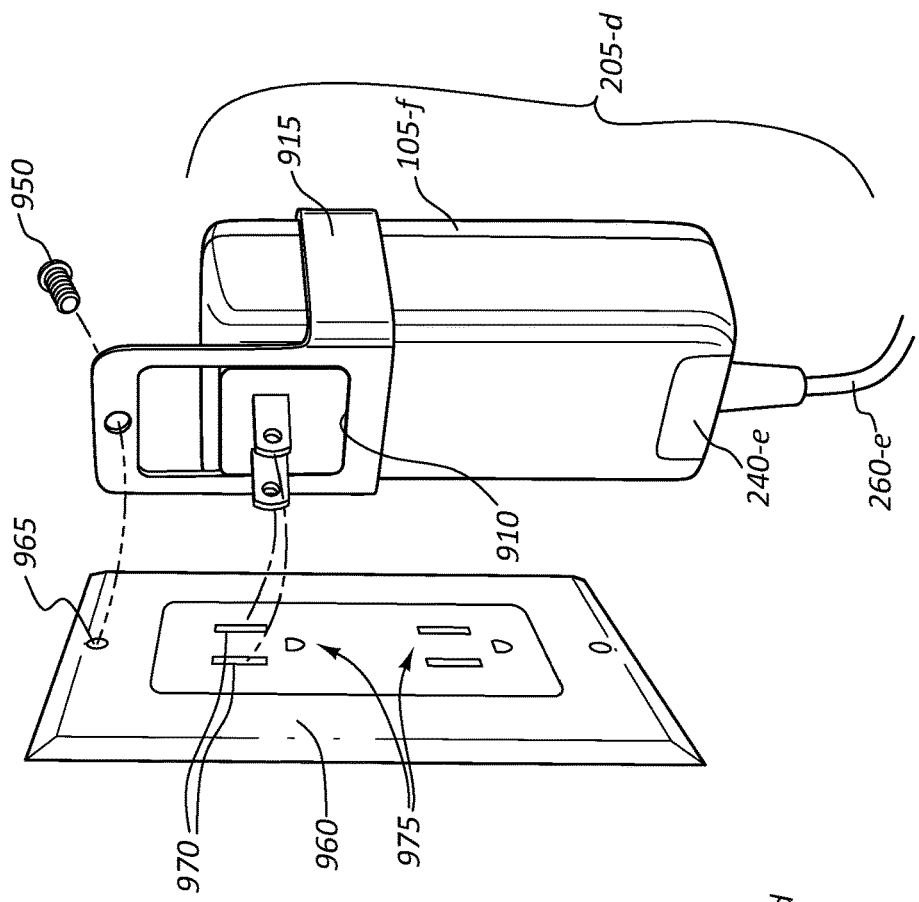
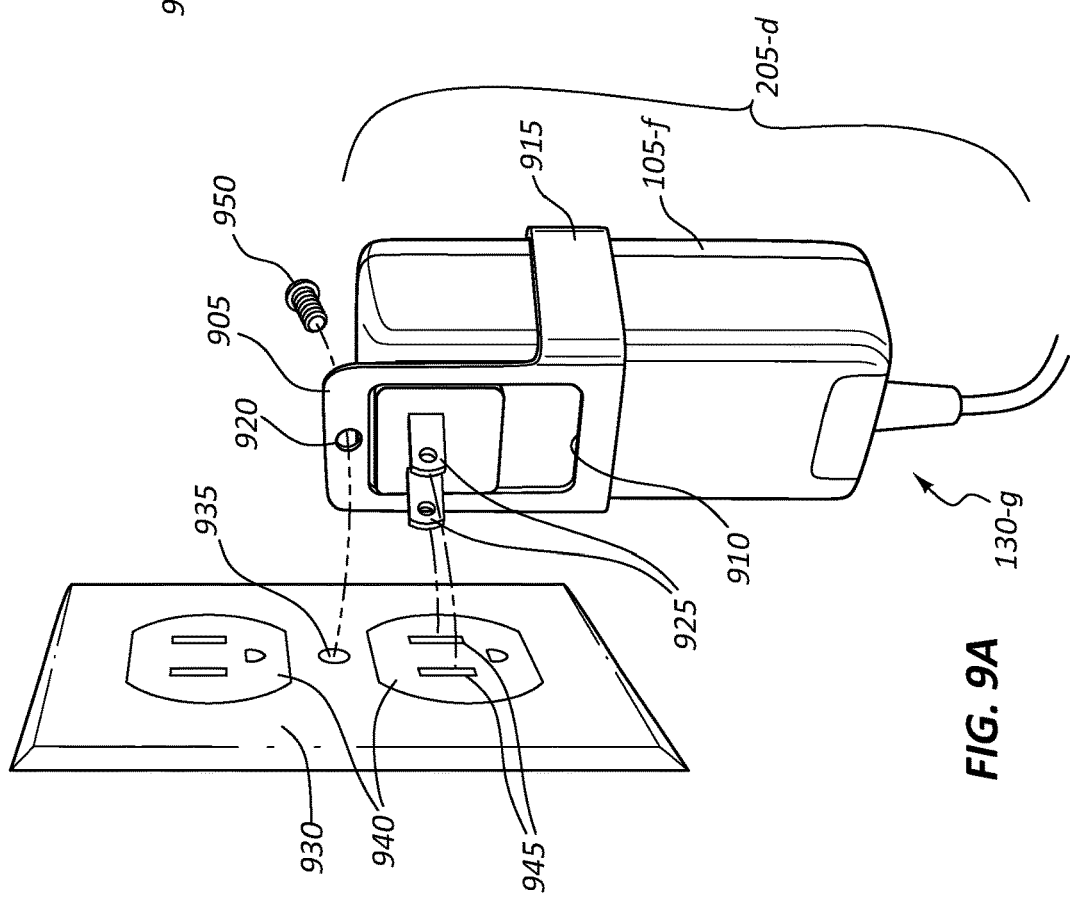

PROJECTING TERMINAL POWER SUPPLY

BACKGROUND

The present disclosure, for example, relates to security and/or automation systems, and more particularly to a projecting terminal power supply assembly and cable.

Security and automation systems are widely deployed to provide various types of communication and functional features such as monitoring, communication, notification, and/or others.

Some electronic devices are compatible with a power supply to provide power. To accommodate installation of some devices, wall wiring may terminate within the power supply. However, terminating wiring in the power supply normally requires the use of tools and time-intensive, complicated labor, and in many instances the assistance of an electrician because a user may not want to—or lack the experience to—complete the wiring or rewiring themselves. These problems are further compounded where there is no readily accessible wall wiring.

SUMMARY

Applications of terminating wall wiring may be challenging due to different requirements and regulations, and difficult installation processes. Connecting particular electronic devices with certain power supplies also presents additional problems. Existing cable end options may not sufficiently facilitate connecting with projecting terminals or with electronic devices. For example, connecting a cable end with a projecting terminal may usually require the use of tools, manual labor, and therefore often require the services of a skilled technician. Furthermore, even after establishing a connection between a cable and a projecting terminal power supply, the end product may not be aesthetically pleasing—leaving both wires and projecting terminal exposed to view—a potentially safety hazard and concerning sight to some home occupants. When such wires, cabling, and projecting terminals are hidden behind walls, such an undesirable visual appearance may not be much of an issue. However, given the challenges mentioned above of terminating wall wiring, and the option of avoiding having to terminate wall wiring inside walls, the aesthetics of cabling and connections outside walls may become more prominent.

In addition, different electronic devices may require particular connectors, may only be compatible with power supplies (e.g., those having certain current ratings), and may be located a distance away from the power supply greater than the length of a pre-existing cable. Moreover, cables, power supplies, and/or electronic devices may not adequately prevent later connection with incompatible components (e.g., power supplies having unacceptable current ratings), which may potentially result in undesirable consequences (including but not limited to equipment failure).

At least some of these challenges may arise in the context of supplying power to security, life safety, information technology, and/or automation system components, among others. Thus, in some embodiments, assemblies, methods, apparatuses, and systems for supplying power to security, life safety, information technology, and/or automation system components are disclosed. One assembly embodiment, for example, may include a power supply with a projecting terminal, and a cable for establishing a connection with the power supply while a first end of the cable contacts the projecting terminal so that the projecting terminal is at least partially covered. In one variation, such a power supply may include a wall plug-in AC adapter. Moreover, some assembly embodiments may further include a second end for connecting with an electronic device. In some examples of the embodiment, the power supply and the cable may be compatible to operate normally with one another, and with the electronic device.

According to at least one embodiment, an assembly for supplying power to security, life safety, information technology, and/or automation system components is disclosed. In some examples, the assembly may include a power supply having a first projecting terminal, the first projecting terminal having a first longitudinal axis and a first distal surface, and a first cable including a first end having a housing portion that at least partially surrounds a first electrical contact having a first electrical contact surface to contact the first distal surface.

In some examples of the assembly, the first electrical contact may include a first spring contact in the housing portion. In some examples, the first cable may include a second end to connect to a first electrical device. In some such examples, the second end may include a removable connector.

In some examples, the housing portion may be keyed to the power supply based at least in part on a first predetermined output of the power supply. In some of these examples, the housing portion may be keyed by any of a slot, or a channel, or a combination thereof. In other examples, the power supply may be keyed to the housing portion based at least in part on a first predetermined output of the power supply.

Some examples of the assembly may include a second cable having a second characteristic and a housing portion that at least partially surrounds an electrical contact surface for contacting the first distal surface. In such examples, the first cable may have a first characteristic different from the second characteristic. Moreover, in such examples, the first characteristic and the second characteristic may include any of a cable length, or a wire gauge, or a connector shape, or a wire end, or a current rating, or a combination thereof.

In some examples of the assembly, the first projecting terminal may include a first screw terminal. In these examples, the power supply may further include a second screw terminal having a second distal surface and a second longitudinal axis. In addition, the first end of the cable may include a second electrical contact having a second electrical contact surface at least partially surrounded by the housing portion. In some examples, the first distal surface of the first screw terminal may establish a positively charged connection by the first electrical contact surface contacting the first distal surface, and the second distal surface of the second screw terminal may establish a negatively charged connection by the second electrical contact surface contacting the second distal surface. Moreover, in some examples, the second electrical contact may include a second spring contact within the housing portion. In other examples of the assembly, the power supply may include a wall plug-in AC adapter.

In some examples, the first screw terminal may adjust along the first longitudinal axis, and the second screw terminal may adjust along the second longitudinal axis. In other examples, the first electrical contact surface may adjust along the first longitudinal axis of the first screw terminal, and the second electrical contact surface may adjust along the second longitudinal axis of the second screw terminal. In some examples, the first distal surface may bias the first electrical contact surface, and the second distal surface may bias the second electrical contact surface. In some examples, the first electrical contact surface may adjust in multiple directions. In some examples of the assembly, the first distal surface and/or the second distal surface each may have a non-planar surface or a convex surface, and the first electrical contact surface, and the second electrical contact surface may each have a non-planar surface or a concave surface.

According to at least one embodiment, a method for supplying power to security, life safety, information technology, and/or automation system components is also described. In some examples, the method may include using a first cable having a first end having a first electrical contact at least partially surrounded by a housing portion, and also having a second end. The method may include, in some examples, providing power to a first projecting terminal having a first longitudinal axis and a first distal surface via a wall plug-in AC adapter, providing power from the first projecting terminal to the first end of a first cable by contacting the first electrical contact with the first distal surface so that the projecting terminal is at least partially covered by the housing portion, and providing power from the second end of the first cable to a first electronic equipment. In some examples, the method may also include evaluating a first power level corresponding to a first electronic equipment, and the first cable may have a first power rating corresponding to the first power level.

According to at least one other embodiment, an cable for supplying power to security, life safety, information technology, and/or automation system components is disclosed. In some examples, the cable may use a power supply having a first projecting terminal having a first longitudinal axis and a first distal surface. In some examples, the cable may include a first end having a housing portion that at least partially surrounds a first electrical contact having a first electrical contact surface to contact the first distal surface so that the projecting terminal is at least partially covered by the housing portion, and a second end for establishing a power supplying connection to a first electronic equipment. In some examples, the first electrical contact may include a first spring contact in the housing portion.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

FIG. 6A shows a cross-sectional view of an assembly relating to a security, life safety, information technology, and/or an automation system in accordance with various aspects of this disclosure;

FIG. 6B shows a cross-sectional view of an assembly relating to a security, life safety, information technology, and/or an automation system in accordance with various aspects of this disclosure;

FIG. 9A is a perspective view of a bracket assembly relating to a security, life safety, information technology, and/or an automation system in accordance with various aspects of this disclosure.

FIG. 9B is another perspective view of a bracket assembly relating to a security, life safety, information technology, and/or an automation system in accordance with various aspects of this disclosure.

DETAILED DESCRIPTION

Figure 1:
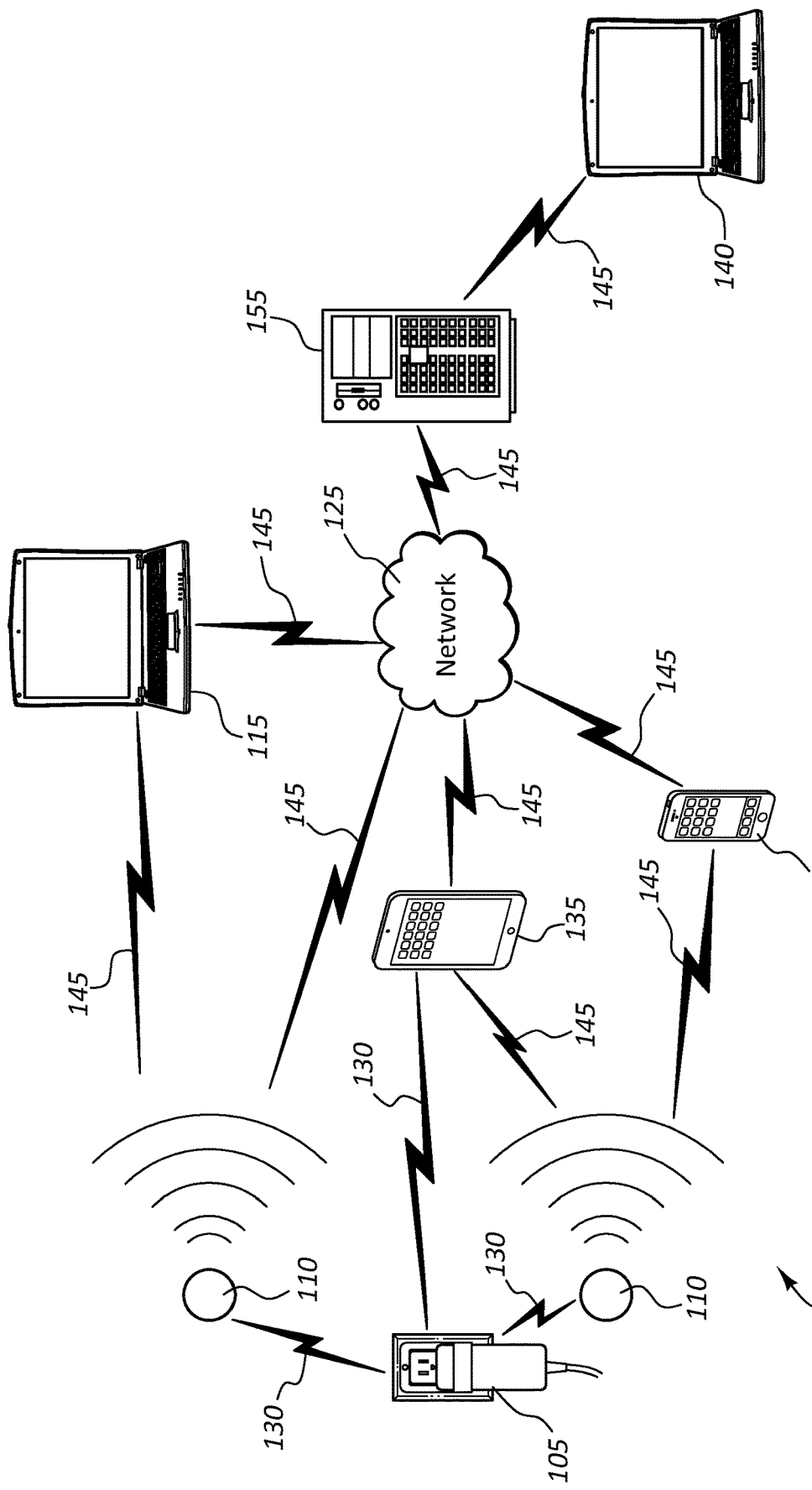
FIG. 1 is a block diagram of an example of a security, life safety, information technology, and/or automation system in accordance with various embodiments.

The assemblies, apparatuses, systems, and methods described herein may include an assembly that simplifies providing a projecting terminal power supply to equipment. Some assembly embodiments may include a screw terminal power supply in the form of a wall plug-in AC adapter with built-in screw terminals, and a cable for connecting the screw terminals with one or more electronic devices or equipment items. In some embodiments, the cable may conveniently attach to and detach from the screw terminal power supply on one end and an electronic device on the other end.

A screw terminal power supply may include a screw having a tip, a post, a threaded portion of the post, and a head. In some cases, a wire is looped around the post of the screw (or the wire is secured into a looped connector, placed around the post) and then the screw is tightened, securing the wire in place. Although screw terminals generally utilize screws for screw terminals, it is anticipated that other types of objects may be utilized in similar manners. For example, a post may not only be found on screws, but rather may be a feature of a projecting terminal not necessarily including a screw. Some screw alternatives may include a post, a column, a pole, a pillar, etc. In some embodiments, these alternatives may also have smooth and/or textured sections (similar to threaded and non-threaded portions), but others may not, yet may contract and expand along a longitudinal axis (if at all) by some other means. Thus, the assemblies, apparatuses, methods, and systems described herein contemplate alternatives to screw terminals.

In some embodiments, a projecting terminal may include at least one power transmitting surface and a distal end. In some embodiments at least one power transmitting surface may not necessarily be located at the distal end, or along the post, but rather may be located adjacent to or connected to the base of the post.

Cable embodiments described herein may also include an end for contacting a projecting terminal to establish an electrical connection. The cable end may have a housing for covering at least a portion of the projecting terminal when the cable end is contacting the projecting terminal. The cable end may also include an electrical contact surface for contacting a power transmitting surface of the projecting terminal to establish an electrical connection. In some embodiments where the distal surface of the projecting terminal is a power transmitting surface, a power transmitting surface of the cable end may be configured to contact that power transmitting distal surface to establish the electrical connection. While the electrical connection is established in this manner, the housing portion of the first end may at least partially surround the power transmitting surface and at least partially cover the distal end of the projecting terminal. In some embodiments, the housing portion also at least also partially surround a spring or other feature capable of expanding and contracting along the longitudinal axis of the projecting terminal (and/or in other directions), and for applying pressure from the electrical contact surface towards and against (and/or biasing) the distal end power transmitting surface, or against a power transmitting surface at some other location. In some other cable end embodiments, the housing portion may at least partially cover the projecting terminal while an electrical contact surface of the cable end contacts a power transmitting surface (whether or not located at the distal end) in order to establish an electrical connection. The assemblies, apparatuses, methods, and systems described herein may contemplate utilizing alternatives and/or equivalents to a spring to accomplish similarly contemplated functions (such as any elastic object or material that expands and retracts with pressure, such as foam, rubber, or a volume of compressible gas).

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is an example of a communications system 100 in accordance with various aspects of the disclosure. In some embodiments, the communications system 100 may include one or more power supplies 105, sensor units 110, local computing devices 115, 120, network 125, servers 155, control panels 135, and remote computing devices 140. One or more power supplies 105 may provide power to one of more electronic devices such as sensor units 110, control panel 135, etc., through power cords, wires, and/or cables 130. One or more sensor units 110 may communicate via wired or wireless communication links 145 with one or more of the local computing devices 115, 120 or network 125. The network 125 may communicate via wired or wireless communication links 145 with the control panel 135 and the remote computing device 140 via server 155. In alternate embodiments, the network 125 may be integrated with any one of the local computing devices 115, 120, server 155, or remote computing device 140, such that separate components are not required.

Local computing devices 115, 120 and remote computing device 140 may be custom computing entities configured to interact with sensor units 110 via network 125, and in some embodiments, via server 155. In other embodiments, local computing devices 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 155, and network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120.

Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some embodiments, local computing devices 115, 120 may communicate with remote computing device 140 or control panel 135 via network 125 and server 155. Examples of a network 125 may include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing devices 115, 120 from remote computing device 140. For example, in some embodiments, remote computing device 140 may include a mobile application that interfaces with one or more functions of local computing devices 115, 120.

The server 155 may be configured to communicate with the sensor units 110, the local computing devices 115, 120, the remote computing device 140 and control panel 135. The server 155 may perform additional processing on signals received from the sensor units 110 or local computing devices 115, 120, or may simply forward the received information to the remote computing device 140 and control panel 135.

Server 155 may be a computing device operable to receive data streams (e.g., from sensor units 110 and/or local computing devices 115, 120 or remote computing device 140), store and/or process data, and/or transmit data and/or data summaries (e.g., to remote computing device 140). In some embodiments, server 155 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 155. For example, the sensor units 110 and/or the local computing devices 115, 120 may be configured to transmit data as it is generated by or entered into that device. In some instances, the sensor units 110 and/or the local computing devices 115, 120 may periodically transmit data (e.g., as a block of data or as one or more data points).

The server 155 may include a database (e.g., in memory) containing data received from the sensor units 110 and/or the local computing devices 115, 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

The power supply 105 in some embodiments may include a wall plug-in AC adapter. In the same or other embodiments, the power supply may include a screw terminal power supply. Through the cables 130, the power supply 105 may provide power to and/or communicate with other components of the system 100. For example, through the cables 130, the power supply 105 may provide power to and/or communicate with the control panel 135 and sensor units 110. The power supply 105 (including one or more cables 130) may also provide power to and/or communicate with other components of the system 100 such as the local computing devices 115, 120, the remote computing device 140, and/or the server 155, as well as other electronic devices of similar and/or related systems. System 100 embodiments of course may include a plurality of the components shown (e.g., a plurality of power supplies 105).

Figure 2:
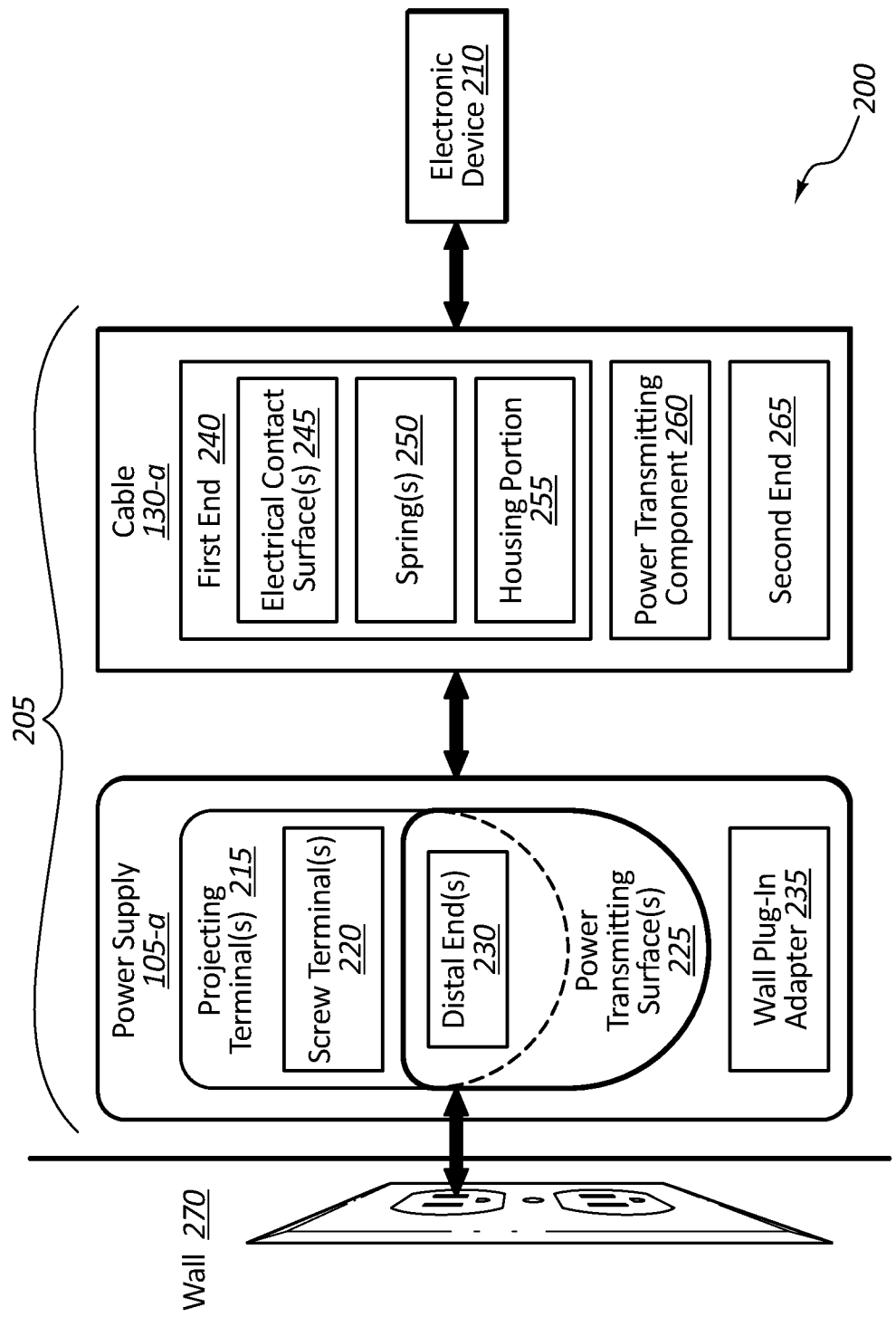
FIG. 2 shows a block diagram of an assembly relating to a security, life safety, information technology, and/or an automation system in accordance with various aspects of this disclosure.

FIG. 2 shows a block diagram 200 of an assembly 205 for providing power to at least one electronic device 210, in accordance with various aspects of this disclosure. In some examples, the electronic device 210 may include one or more aspects of the control panel 135, sensor units 110, and local computing devices 115, 120 of FIG. 1, among others. The assembly 205 may include a power supply 105-a, and a cable 130-a. The power supply 105-a may include at least one projecting terminal 215, which in some embodiments may have a first longitudinal axis. In some embodiments, the projecting terminal 215 may also have a distal end 230 (e.g., a first distal end). The power supply 105-a may also include at least one power transmitting surface 225 and/or at least one power transmitting component. In some embodiments, at least one power transmitting surface 225 may include the distal end 230 of the projecting terminal 215. In some embodiments, at least one power transmitting surface 225 may not include the distal end 230. And in some embodiments, no power transmitting surface 225 may include the distal end 230.

In some embodiments, the power supply 105-a may include at least one screw terminal 220 and in some cases multiple screw terminals 220 (e.g., a first screw terminal for establishing a positively charged connection, and a second screw terminal for establishing a negatively charged connection). In some embodiments, each screw terminal 220 may include at least one power transmitting surface 225 of FIG. 2. In some of those embodiments, at least one power transmitting surface 225 may be located at the distal end(s) 230 of the screw terminal(s) 220 (e.g., a first distal end of a first screw terminal and a second distal end of a second screw terminal). In addition, in some embodiments, the power supply 105-a may include a wall plug-in AC adapter 235 for plugging into a wall 270. Different power supply 105-a embodiments may have varying voltage (e.g., 12V, 5V) and current ratings (e.g., 2.5 A, 2 A, 1.5 A, 1 A).

The cable 130-a may have a first end 240. The first end 240 may include at least one electrical contact surface 245 to contact the power transmitting surface 225 of the power supply 105-a (e.g., to contact a distal end 230 thereof that is a power transmitting surface 225) and/or one or more other components and/or areas of power supply 105-a component. The first end 240 may also include a housing portion 255. In some embodiments, the housing portion 255 may at least partially surround the electrical contact surface(s) 245 of the cable 130-a (which surfaces may include, for example, a first electrical contact for contacting the first distal end of the first screw terminal and a second electrical contact for contacting the second distal end of the second screw terminal, among other areas or components). Thus, in some embodiments, the housing portion 255, and the electrical contact surface(s) 245 may all form at least part of a first end 240 of the cable 130-*a*. In some embodiments, the housing portion 255 may be detachable or separable from cable 130-*a* to facilitate replacement or pairing with different cables 130-*a* and power supplies 105-*a*. In other embodiments, the housing portion 255 may not be detachable or separable from cable 130-*a*, but may be integrated or permanently affixed to cable 130-*a* or power supply 105-*a*.

In addition, in some embodiments the first end 240 may include at least one spring 250. In some embodiments, the spring 250 may also be at least partially surrounded by the housing portion 255 of the first end 240. In some embodiments, the spring 250 may be at embedded within, connected to, coupled to, and/or in contact with the housing portion 255 of the first end 240. In some examples, the housing portion 255 may be configured to at least partially cover the projecting terminal(s) 215 when the first end 240 of the cable 130-*a* is in an engaged position with the power supply 105-*a* (including at least partially covering the screw terminal(s) 220 in relevant embodiments where the power supply 105-*a* includes a screw terminal power supply). In some embodiments, the housing portion 255 may be configured so that when the first end 240 is in an engaged position with the power supply 105-*a* component, the projecting terminal(s) 215 may be completely surrounded and/or covered (or at least any metal sections of the first end 240 may be covered). Covering metal and screw terminals 220 in this manner may provide comfort to homeowners concerned of perceived or real risks associated with any exposed screw terminal(s) 220. In some embodiments, the housing portion 255 may be configured so that when the first end 240 is in an engaged position with the power supply 105-*a* component, the projecting terminal(s) 215 may be only partially surrounded and/or covered (or at least some metal sections of the first end 240 may be covered). Covering metal and screw terminals 220 in this manner may provide methods to monitor one or more components related to assembly 205.

In some embodiments, the spring(s) 250 may adjust the electrical contact surface(s) 245 (and in some embodiments, the spring(s) 250 may adjust the electrical contact surface(s) 245 along a longitudinal axis of the projecting terminal(s) 215). In other embodiments, the spring(s) 250 may adjust other surfaces for contacting the projecting terminal(s) 215 and/or the distal end(s) 230 thereof. In some embodiments where the spring(s) 250 may not adjust the electrical contact surface 245, the distal end(s) 230 of the projecting terminal (s) 215 may not necessarily include power transmitting surface(s) 225 (yet even in such embodiments there may be (but there is not required to be) at least one electrical contact surface 245 configured to contact at least one power transmitting surface 225).

Moreover, in some embodiments where the power supply 105-*a* may include screw terminals 220 such as a first screw terminal and a second screw terminal, the first end 240 may include at least one electrical contact surface 245 such as a first electrical contact surface adjustable by a first spring, and a second electrical contact surface adjustable by a second spring. In some embodiments, a first electrical contact may include the first spring, and a second electrical contact may include the second spring. In some embodiments, at least one power transmitting surface 225 may be located at the distal end(s) 230 of screw terminal(s) 220, and an electrical connection may be established by the electrical contact surface(s) 245 contacting the at least one power transmitting surface 225 located at the distal end(s) 230, when the first end 240 is attached to the power supply 105-*a* component.

In some examples, one first end 240 embodiment may be configured so that, when the first end 240 is in an attached position, a metal part of an electrical contact surface 245 contacts a uniform (e.g., non-threaded) portion of a screw of the screw terminal(s) 220. An electrical contact surface 245 that is adjustable by a spring 250 may in some embodiments utilize a spring clip design, whereby the first end 240 may attach to the screw of the screw terminal(s) 220, with metal part(s) of the first electrical contact surface contacting the non-threaded metal part(s) of the screw(s). One spring clip design embodiment may utilize annealed spring steel contacts for contacting the non-threaded metal parts of the screws. Some first end 240 embodiments may accommodate a higher current than other connector styles (e.g., USB, barrel). Some first end 240 variations may also facilitate secure attachment of the cable 130-*a* to the power supply 105-*a* component, which in some embodiments may be a screw terminal power supply, and allow removal without substantial use of tools, if any. To that end, some embodiments may be configured to "snap fit" onto or over the screw terminals 220. In addition, in some embodiments the first end 240 may be form fitted to an area surrounding the projecting terminal(s) 215 based on friction, projections interacting with depressions, and/or other methods. In any event, power may pass from the power supply 105-*a* to the cable 130-*a*.

The cable 130-*a* may also include a second end 265, and a power transmitting component 260 connecting the first end 240 with the second end 265 of the cable 130-*a*. In some embodiments the second end 265 may connect to one or more electronic devices 210. Second end 265 embodiments may vary in design (e.g., right angle barrel jack, straight barrel jack, USB, micro USB) to accommodate various types of equipment, including input connections thereof. One second end 265 embodiment may comprise a visual identifier (such as color coding) corresponding to a particular equipment type. Some second end 265 embodiments may be customizable to different electronic devices (and as further explained below). Power may pass from the cable 130-*a* to the electronic device 210. The electronic device 210 may include one or more aspects of the control panel 135, sensor units 110, and local computing devices 115, 120 of FIG. 1.

Figure 3:
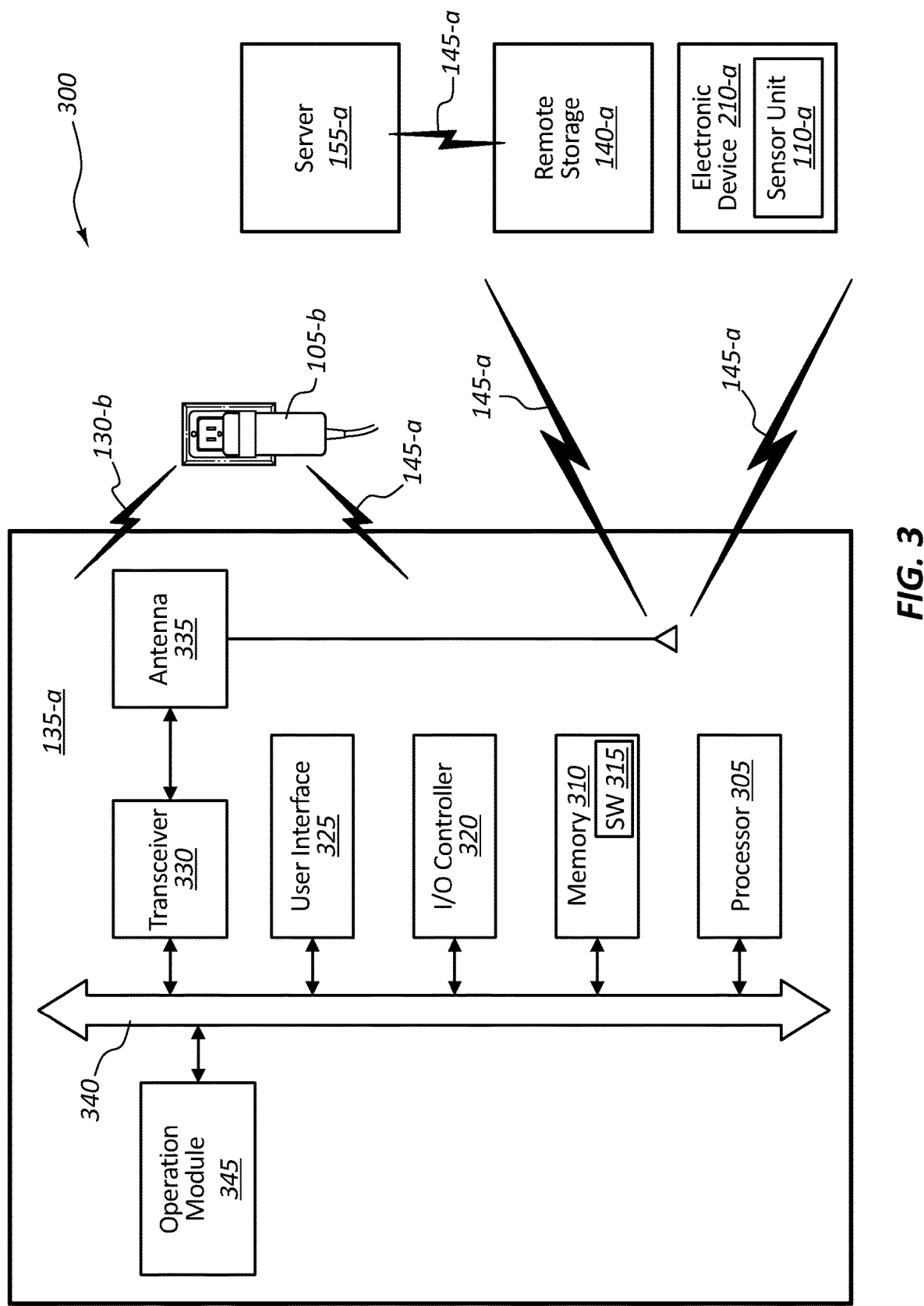
FIG. 3 shows a security, life safety, information technology, and/or an automation system in accordance with various aspects of this disclosure.

FIG. 3 shows a system 300 for use in security, life safety, information technology, and/or automation systems, in accordance with various examples. System 300 may include a control panel 135-*a*, which may be an example in one or more aspects of the control panel 135 of FIG. 1.

Control panel 135-*a* may include one or more operation modules 345, which may perform certain operations for security, life safety, information technology, and/or automation systems. In some embodiments, the terms a control panel and a control device are used synonymously. Control panel 135-*a* may also include components for bi-directional voice and data communications including components for transmitting communications and components for receiving communications. For example, control panel 135-*a* may communicate bi-directionally with one or more of electronic device 210-*a*, one or more sensor units 110-*a*, remote computing device 140-*a* (which may be an example of a remote storage device), and/or server 155-*a*, which may be an example of the server of FIG. 1, and which may be a remote server in some embodiments. This bi-directional communication may be direct (e.g., control panel 135-*a* communicating directly with remote computing device 140-*a*) or indirect (e.g., control panel 135-*a* communicating indirectly with server 155-*a* through remote computing device 140-*a*).

Control panel 135-*a*, and one or more electronic devices 210-*a*, and/or sensor units 110-*a* (which sensor units 110-*a* may or may not be included within an electronic device 210-*a*), may receive power from a power supply 105-*b*, through power cords, wires, and/or cables 130-*b*. In some instances, the power supply 105-*b* may include a projecting terminal power supply.

Control panel 135-*a* may also include a processor 305, and memory 310 (including software/firmware code (SW) 315), an input/output controller 320, a user interface 325, a transceiver 330, and one or more antennas 335 each of which may communicate—directly or indirectly—with one another (e.g., via one or more buses 340). The transceiver 330 may communicate bi-directionally—via the one or more antennas 335, wired links, and/or wireless links—with one or more networks or remote devices as described above. For example, the transceiver 330 may communicate bi-directionally with one or more of electronic device 210-*a*, remote computing device 140-*a*, and/or server 155-*a*. The transceiver 330 may include a modem to modulate the packets and provide the modulated packets to the one or more antennas 335 for transmission, and to demodulate packets received from the one or more antennas 335. While a control panel or a control device (e.g., 135-*a*) may include a single antenna 335, the control panel or the control device (e.g., 135-*a*) may also have multiple antennas 335 capable of concurrently transmitting or receiving multiple wired and/or wireless transmissions. In some embodiments, the power supply 105-*b* may also have an antenna and/or be in communication with the antenna(s) 335 of the control panel 135-*a*, an electronic device 210-*a*, a sensor unit 110-*a*, remote computing device 140-*a* that is remote storage, and/or remote server 155-*a*. One element of control panel 135-*a* (e.g., one or more antennas 335, transceiver 330, etc.) may provide a direct connection to a server 155-*a* via a direct network link to the Internet via a POP (point of presence). In some embodiments, one element of control panel 135-*a* (e.g., one or more antennas 335, transceiver 330, etc.) may provide a connection using wireless techniques, including digital cellular telephone connection, Cellular Digital Packet Data (CDPD) connection, digital satellite data connection, and/or another connection.

The signals associated with system 300 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals, and may include either wired or wireless communication links 145-*a*. The one or more antennas 335 and/or transceiver 330 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 335 may receive signals or information specific and/or exclusive to itself. In other embodiments, each antenna 335 may receive signals or information not specific or exclusive to itself.

In some embodiments, one or more sensor units 110-*a* (e.g., motion, proximity, smoke, light, glass break, door, window, carbon monoxide, and/or another sensor) may connect to some element of system 300 via a network using one or more wired and/or wireless connections.

In some embodiments, the user interface 325 may include an audio device, such as an external speaker system, an external display device such as a display screen, and/or an input device (e.g., remote control device interfaced with the user interface 325 directly and/or through I/O controller 320).

One or more buses 340 may allow data communication between one or more elements of control panel 135-*a* (e.g., processor 305, memory 310, I/O controller 320, user interface 325, etc.).

The memory 310 may include random access memory (RAM), read only memory (ROM), flash RAM, and/or other types. The memory 310 may store computer-readable, computer-executable software/firmware code 315 including instructions that, when executed, cause the processor 305 to perform various functions. Alternatively, the computer-executable software/firmware code 315 may not be directly executable by the processor 305 but may cause a computer (e.g., when compiled and executed) to perform functions described herein. Alternatively, the computer-readable, computer-executable software/firmware code 315 may not be directly executable by the processor 305 but may be configured to cause a computer (e.g., when compiled and executed) to perform functions described herein. The processor 305 may include an intelligent hardware device, e.g., a central processing unit (CPU), a microcontroller, an application-specific integrated circuit (ASIC), etc.

In some embodiments, the memory 310 can contain, among other things, the Basic Input-Output system (BIOS) which may control basic hardware and/or software operation such as the interaction with peripheral components or devices. For example, the operation module(s) 345 for implementing certain security, life safety, information technology, and/or automation systems and/or methods may be stored within the system memory 310. Applications resident with system 300 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver 330, one or more antennas 335, etc.).

Many other devices and/or subsystems may be connected to one or may be included as one or more elements of system 300 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 3 need not be present to practice the present systems and methods. The devices and subsystems can be interconnected in different ways from that shown in FIG. 3. In some embodiments, an aspect of some operation of a system, such as that shown in FIG. 3, may be readily known in the art and are not discussed in detail in this application. Code to implement the present disclosure can be stored in a non-transitory computer-readable medium such as one or more of system memory 310 or other memory. The operating system provided on I/O controller 320 may be iOS®, ANDROID®, MS-DOS®, MS-WINDOWS®, OS/2®, UNIX®, LINUX®, or another known operating system.

The transceiver 330 may include a modem configured to modulate the packets and provide the modulated packets to the antennas 335 for transmission and/or to demodulate packets received from the antennas 335. While the control panel or control device (e.g., 205-b) may include a single antenna 335, the control panel or control device (e.g., 205-b) may have multiple antennas 335 capable of concurrently transmitting and/or receiving multiple wireless transmissions.

Figure 4:
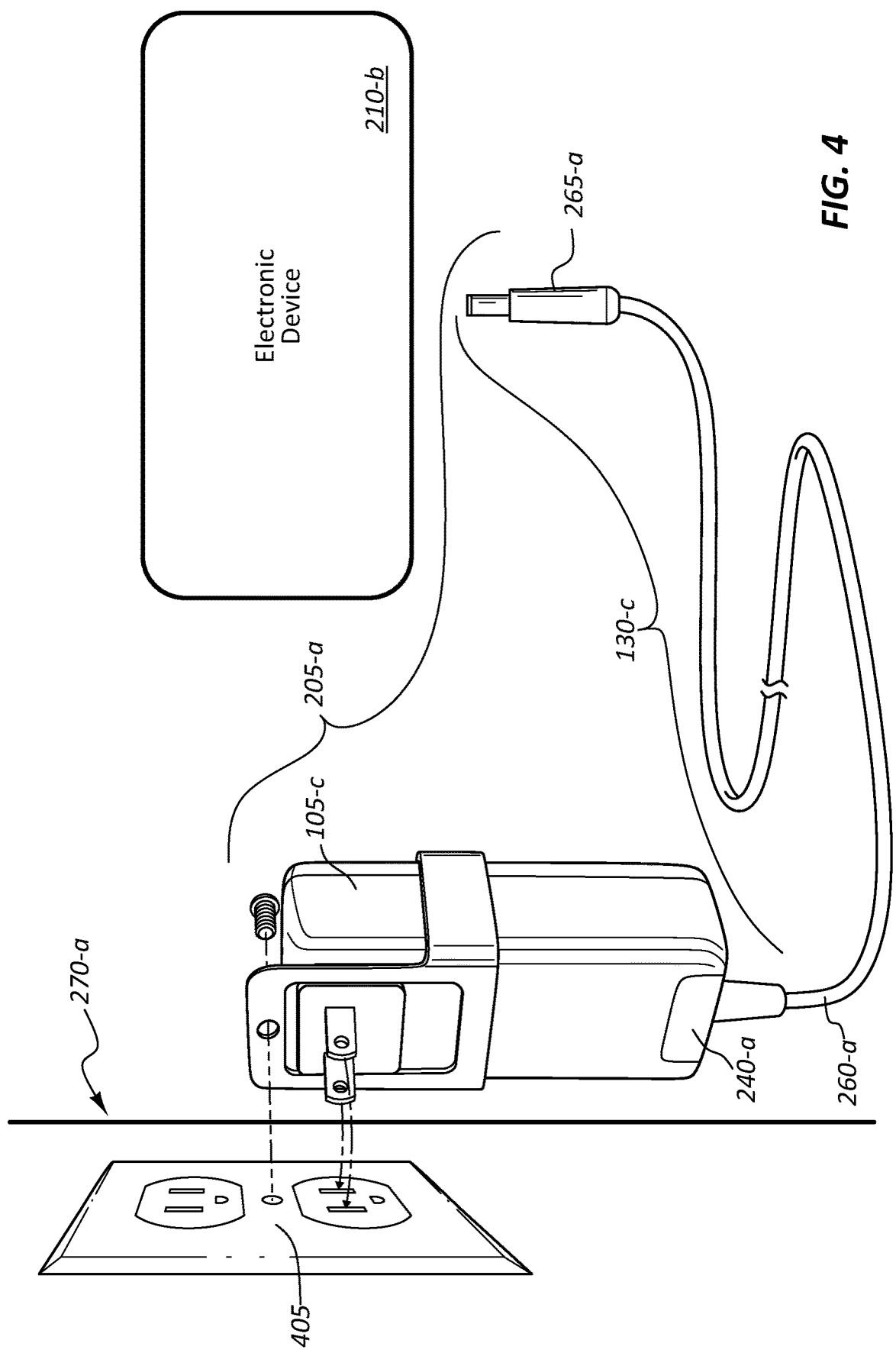
FIG. 4 shows a perspective view of an assembly relating to a security, life safety, information technology, and/or an automation system in accordance with various aspects of this disclosure.

FIG. 4 is a perspective view of an assembly 205-a for security, life safety, information technology, and/or automation systems. In some embodiments, the assembly may include a power supply 105-c. The power supply 105-c may be similar in one or more aspects to the power supply 105, 105-a, and 105-b of FIGS. 1-3, among others. In some embodiments, the power supply 105-c may include a wall plug-in AC adapter to plug into a socket 405 of a wall 270-a. In other embodiments, the power supply 105-c may not include a wall plug-in AC adapter. In some embodiments, the power supply 105-c may include a projecting terminal power supply. In additional embodiments, the power supply 105-c may include both a wall plug-in AC adapter and a screw terminal power supply.

The assembly 205-a may also include a cable 130-c. The cable 130-c may be in one or more aspects similar to the cable 130, 130-a, 130-b of FIGS. 1-3, among others. Power may be transmitted from the power supply 105-c to the cable 130-c. The cable 130-c may include a first end 240-a. The first end 240-a may be in one or more aspects similar to the first end 240 of FIG. 2, among others. The cable 130-c may also include a second end 265-a, and a power transmitting component 260-a connecting the first end 240-a and the second end 265-a. The power transmitting component 260-a and the second end 265-a may be similar in one or more aspects to the power transmitting component 260 and the second end 265 of FIG. 2, among others. The second end 265-a may in some embodiments connect with an electronic device 210-b (which may be similar in one or more aspects to the electronic device 210, 210-a of FIGS. 2-3).

In some aspects cable 130-c embodiments may be "universal" or customizable, providing the capability to various end products (e.g., electronic equipment 210-b). For example, some cable 130-c embodiments may be custom configured to an end product (e.g., an electronic device 210-b) instead of requiring a particular power supply for different end products. By way of more specific examples, some customized configurations may include specific lengths of the power transmitting component 260-a, wire gauges, bare tinned leads and second end 265-a types (e.g., straight barrel connectors, right angle barrel connectors), etc. In any event, using cable 130-c embodiments and/or assembly 205-a embodiments similar to those described herein, it is anticipated that installers of security, life safety, and/or automation equipment (among other equipment types) may not be required to carry as many power supplies with them to accommodate various types of end products. In some embodiments, anticipated customizing/repurposing may also allow for broader application than prior art power supply assemblies—e.g., making available a screw terminal power supply for information technology equipment (such as an external hard drive, a computer, telecommunications equipment, a monitor, a keyboard, a printer, a server, a network HUB, a sensor, or a remote camera).

Figure 5:
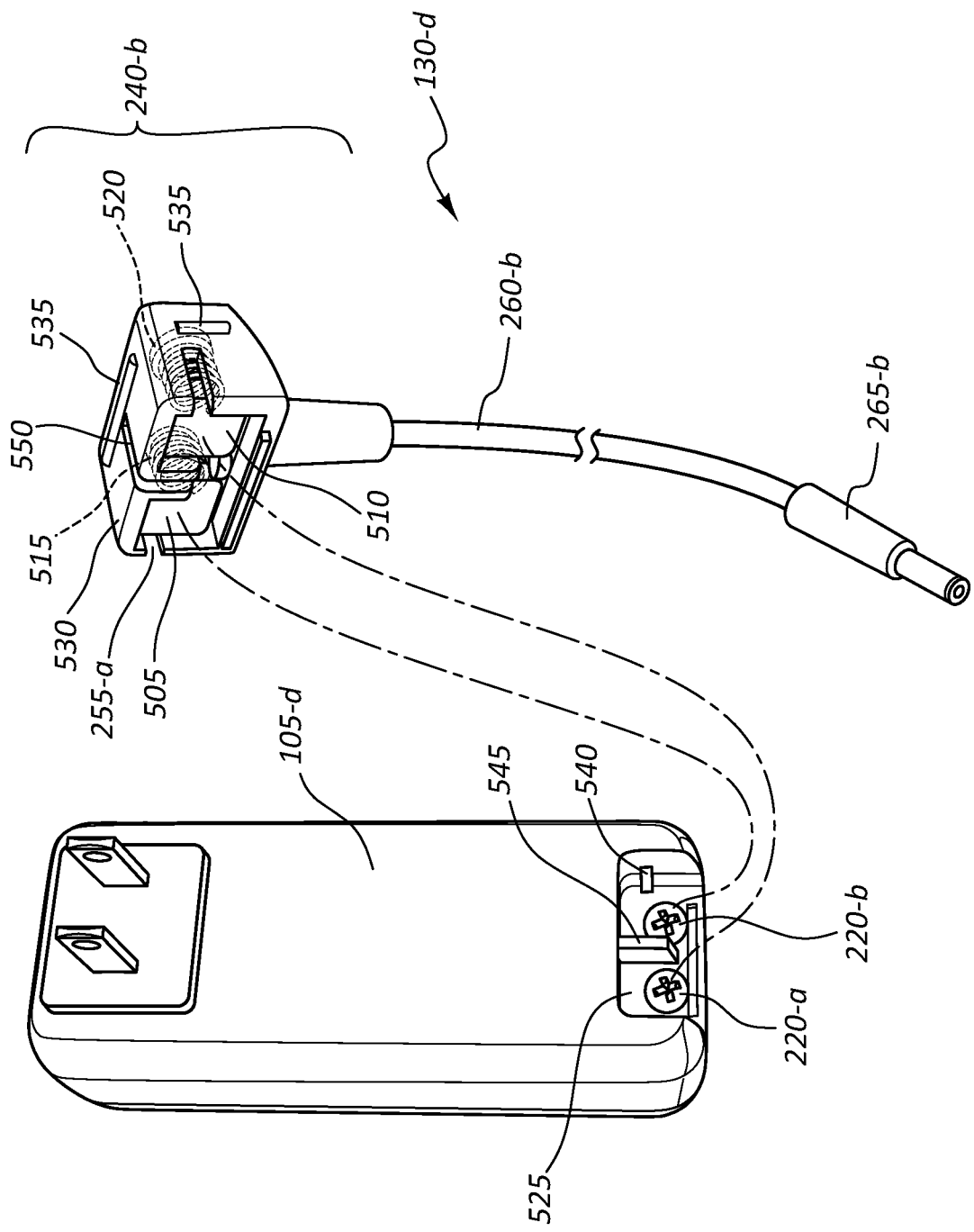
FIG. 5 shows a perspective view of a cable relating to a security, life safety, information technology, and/or an automation system in accordance with various aspects of this disclosure.

FIG. 5 is a front view of a cable 130-d for security, life safety, information technology, and/or automation systems. The cable 130-d may be similar in one or more aspects to the cable 130, 130-a, 130-b, 130-c of FIGS. 1-4, among others. The cable 130-d may include a first end 240-b. The first end 240-b may be similar in one or more aspects to the first end 240, 240-a of FIGS. 2 and 4, among others. The first end 240-b may include a first electrical contact 505 and a second electrical contact 510. The first end 240-b may further include a housing portion 255-a, which may at least partially surround the first electrical contact 505 and the second electrical contact 510. In addition, the first end 240-b may include a first spring 515 and a second spring 520, aligned with the first electrical contact 505 and the second electrical contact 510, respectively. In some embodiments, the first end 240-b may include multiple first springs 515 and multiple second springs 520, which may each be aligned with and bias the first electrical contact 505 and the second electrical contact 510, respectively. These multiple first springs 515 and multiple second springs 520 may provide added uniformity and ensure deliberate and sufficient contact between the first electrical contact 505 and the second electrical contact 510 and the respective first screw terminal 220-a and second screw terminal 220-b, respectively.

The cable 130-d may also include a power transmitting component 260-b (which may be similar in one or more aspects to the power transmitting component 260-a of FIG. 4, and the power transmitting component 260 of FIG. 2). In some embodiments, the cable 130-d may also include a second end 265-b. The second end 265-b may be similar in one or more aspects to the second end 265, 265-a of FIGS. 2 and 4, among others.

A power supply 105-d may have a first screw terminal 220-a and a second screw terminal 220-b, in a cavity or an indented portion 525 thereof. The first end 240-b may be configured to match the indented portion 525—in some embodiments so that the first end 240-b, or a portion thereof, snap fits or is secured within at least a portion of the indented portion 525. While the first end 240-b is fitted therein, the first electrical contact 505 and the second electrical contact 510 may align with, and contact, the first screw terminal 220-a and the second screw terminal 220-b, respectively, within the indented portion 525 of the power supply 105-d. The first end 240-b may also have ridges 535 or other features for snap fitting into—or otherwise fitting securely into—the indented portion 525.

The first end 240-b may also include one or more keying components 530. In some first end 240-b embodiments, one or more keying components 530, 550 may ensure connection with a particular power supply 105-d having a predetermined output and a cable 130-d configured for that particular power supply (e.g., ensuring that a 12V DC power supply may only connect to a cable component for 12V DC), and prevent connection with other non-compatible power supplies (e.g., a 5V DC power supply). In some embodiments, the housing portion 255-a may include keying components 530, 550 in the form of slots, holes, openings, spaces, gaps, windows, or channels, each for establishing a connection with a different power supply having a different voltage output. In some examples, keying components 530 may allow custom "keying" of either the first end and/or the power supply by, for example, an installer. Although keying components 530, 550 are shown on the first end 240-b of the cable 130-d, alternatively in some embodiments the power supply 105-d may also include keying components 540, 545, which may also facilitate achieving a more secure attachment between the power supply 105-d and the cable 130-d. In some embodiments the keying components may facilitate keying or mating in a first direction (e.g., horizontally, away from and/or perpendicular to a wall or a power supply's length) and/or a second direction (e.g., vertically, parallel to a wall or a power supply's width), in an intermediate direction (non-horizontal and/or non-vertical, and/or some combination. For example, a particular keying component 550 of the first end 240-*b* may mate with a corresponding keying component 545 found in the indented portion 525 of the power supply 105-*d*.

FIG. 6A is a cross-sectional view of an assembly 205-*b* for security, life safety, information technology, and/or automation systems. The assembly 205-*b* may include a power supply 105-*e*, which may be in some examples a projecting terminal power supply, having a screw terminal 220-*c*. The screw terminal 220-*c* may be in one or more aspects similar to the screw terminals 220, 220-*a*, 220-*b* of FIGS. 2, 5. The screw terminal 220-*c* may also have a distal end 230-*a* that may be a power transmitting surface.

The assembly may also include a cable 130-*e*. The cable 130-*e* may be similar in one or more aspects to the cable 130, 130-*a*, 130-*b*, 130-*c*, 130-*d* of FIGS. 1-5. The cable 130-*e* may include a first end 240-*c*. The first end 240-*c* may be similar in one or more aspects to the first end 240, 240-*a*, 240-*b* of FIGS. 2, 4-5. The first end 240-*c* may include a first electrical contact 505-*a*. The first electrical contact 505-*a* may be similar in one or more aspects to the first electrical contact 505 of FIG. 5. The first end 240-*c* may further include a housing portion 255-*b*, which may at least partially surround the first electrical contact 505-*a*. The housing portion 255-*b* may be similar in one or more aspects to the housing portion 255, 255-*a* of FIGS. 2 and 5. The first end 240-*c* may also include a first spring 250-*a* (which may be similar in one or more aspects to the first spring 515 of FIG. 5). The cable 130-*e* may also have a power transmitting component 260-*c*.

In the embodiment shown, the spring 250-*a* may expand and contract longitudinally along the axis of the screw terminal 220-*c* to adjust to the length of the screw terminal 220-*c* while first electrical contact 505 (or the electrical contact surface thereof) may still maintain contact with the screw terminal 220-*c*. In such a state of the first electrical contact 505 contacting the screw terminal 220-*c*, and the cable 130-*e* connected to the power supply 105-*e*, the screw terminal 220-*c* may be covered so that no metal portion thereof is exposed. The distal end of the screw terminal 220-*c* may also bias the first electrical contact 505 (or the electrical contact surface thereof). In some embodiments, spring 250-*a* may comprise a metal, a plastic, a non-conductive material, an insulator, a composite, a metallic glass, some other material, and/or some combination of one or more materials. In some embodiments, one or more other alternatives may be used in addition to or instead of spring 250-*a*. These alternatives may include, among others, variations a formed foam, a formed rubber, a compliant mechanism, metallic glass, a biasing component, a plastic component, an elastic component, a malleable component, etc.

It should be understood that in some examples the force exerted by the screw terminal along its longitudinal axis against the first end 240-*c* (after the spring has contracted) is less than the force in an opposite direction maintaining the first end 240-*c* connected with the power supply 105-*e*. Such force in the opposite direction may be achieved in a variety of ways, but not limited to utilizing the ridges 535 of FIG. 6, a snap fit, a locking mechanism, etc. In some examples, the first end 240-*c* may connect with the power supply 105-*e* but wires may still be utilized in a conventional manner around the screw terminal. Relatedly, some first end 240-*c* embodiments may accommodate not only the conventional wires, but also a variety of wire gauge sizes. In other words, the power supply 105-*e* of some assembly 205-*b* embodiments may include a screw terminal power supply that allows both direct connection of discrete wiring, and connection to the cable 130-*e*—and/or to a variety of cables, first ends (e.g., 240-*c*), power transmitting components, and second ends. In some contemplated first end 240-*c* embodiments, some electrical contact surface(s) of the first end 240-*c* may contact a power transmitting surface not located at the distal end 230-*a* of the screw terminal 220-*c*.

FIG. 6B is a cross-sectional view of an assembly embodiment 205-*c* for security, life safety, information technology, and/or automation systems. The cable 130-*f* may be similar in one or more aspects to the cable 130-*e* of FIG. 6, and may include a first end 240-*d* that may be similar in one or more aspects to the first end 240-*c* of FIG. 6A. In some embodiments, the first end 240-*d* may include a first electrical contact 505-*b* having (an electrical contact surface with) a convex shape, a non-planar shape, a concave shape, or other shape for maximizing the surface area of the first electrical contact 505-*b* for contacting the surface area of the distal end 230-*b* of a screw terminal 220-*d*, or otherwise conforming more precisely to the shape of the screw terminal 220-*d* and/or the distal end 230-*b* thereof. In other embodiments, the surfaces of electrical contacts may have varying shapes (e.g., non-planar surface or convex). In some embodiments, a first electrical contact surface may adjust, not only in the direction of the longitudinal axis of the screw terminal 220-*d*, but also in multiple directions in various dimensions (e.g., x direction, y direction, z direction, or some combination).

In some embodiments, one or more other alternatives may be used in addition to or instead of screw terminal 220-*d*. These alternatives may include, among others, a post, a projection, a column, a pole, a pillar, etc. Some such alternatives may include smooth and/or textured sections.

Figure 7:
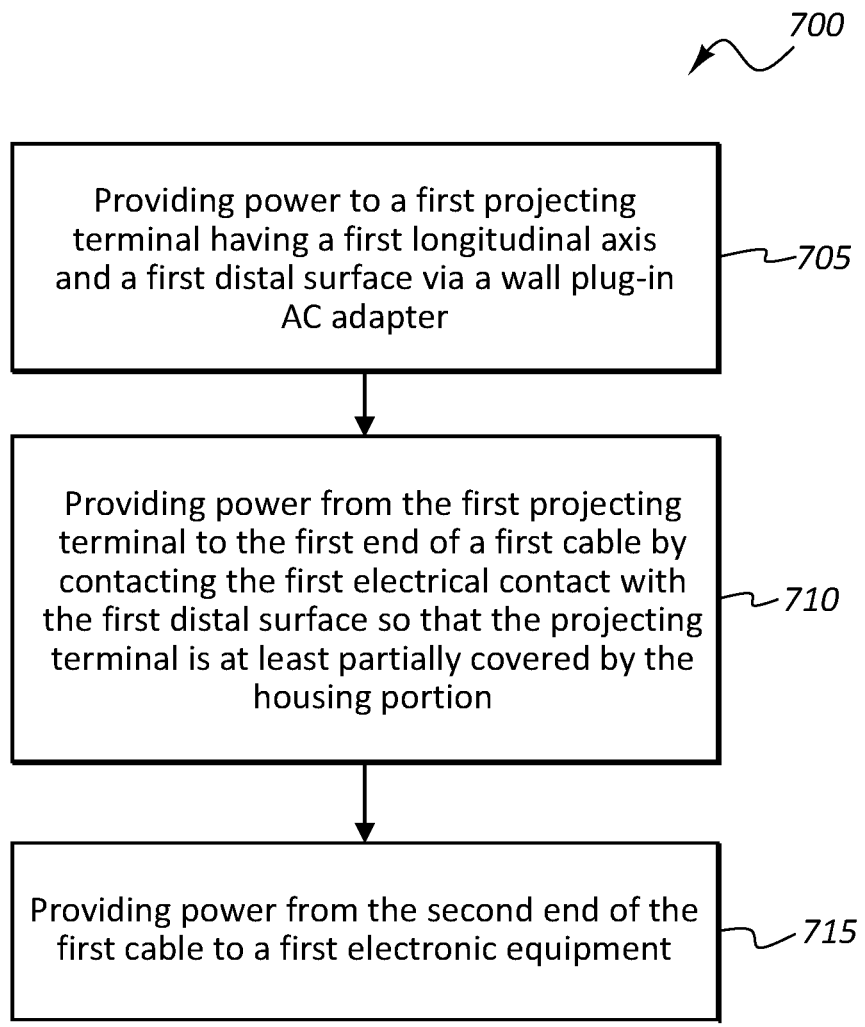
FIG. 7 is a flow chart illustrating an example of a method relating to a security, life safety, information technology, and/or an automation system in accordance with various aspects of this disclosure.

FIG. 7 is a flow chart illustrating an example of a method 700 for supplying power to security, life safety, information technology, and/or automation system components in accordance with various aspects of the present disclosure. For clarity, the method 700 is described below with reference to aspects of one or more of the power supply 105, 105-*a*, 105-*b*, 105-*c*, 105-*d*, 105-*e* described with reference to FIGS. 1-6B, and/or aspects of one or more of the cable 130, 130-*c*, 130-*d*, 130-*e*, 130-*f*, and cable 130-*a*, 130-*b*, described with reference to FIGS. 1-6B, among others. In some examples, the method 700 may involve using a first cable having a first end with a first electrical contact at least partially surrounded by a housing portion, and a second end.

At block 705, the method 700 may include providing power to a first projecting terminal having a first longitudinal axis and a first distal surface via a wall plug-in AC adapter. The operations at block 705 may be performed using the socket 405 of the wall 270-*a* as described in FIG. 4, the power supply 105, 105-*a*, 105-*b*, 105-*c*, 105-*d*, 105-*e* described with reference to FIGS. 1-6B, and/or the projecting terminal 215 described with reference to FIG. 2 among others. In some embodiments, the wall plug-in AC adapter may include the first projecting terminal. In some methods, power, voltage, current, and/or other related electrical information may be provided via a projecting terminal that is not included in a wall plug-in AC adapter.

At block 710, the method 700 may include providing power from the first projecting terminal to the first end of a first cable by contacting the first electrical contact with the first distal surface so that the projecting terminal is at least partially covered by the housing portion. The operations at block 710 may be performed using the cable 130, 130-*c*, 130-*d*, 130-*e*, 130-*f*, and cable 130-*a*, 130-*b*, described with reference to FIGS. 1-6B, and the first end 240, 240-*a*, 240-*b*, 240-*c*, 240-*d* of FIGS. 2, 4-6B among others. In some embodiments, the first electrical contact may contact the first distal surface while the first end is releasably attached to the power supply. In some embodiments, the first end and/or the power supply may be configured so that the first end detaches when a threshold level of force is applied in one or more predetermined directions. In some examples, the housing portion may completely cover the projecting terminal.

At block 715, the method may also include providing power from the second end of the first cable to a first electronic equipment. The operations at block 715 may be performed using the power transmitting component 260, 260-a, 260-b, 260-c, 260-d, 260-e the second end 265, 265-a, 265-b described with reference to FIGS. 2, 4-6B and 9A-9B, the electronic device 210, 210-a 210-b of FIG. 2-4, the sensor units 110, 110-a of FIG. 2-3, the control panel 135, 135-a of FIGS. 1 and 3, and the cable 130, 130-c, 130-d, 130-e, 130-f, and the cable 130-a, 130-b described with reference to FIGS. 1-6B among others.

Thus, the method 700 may provide for supplying power to security, life safety, information technology, and/or automation system components. It should be noted that the method 700 is just one implementation and that the operations of the method 700 may be rearranged or otherwise modified such that other implementations are possible and contemplated in accordance with various aspects of this disclosure.

Figure 8:
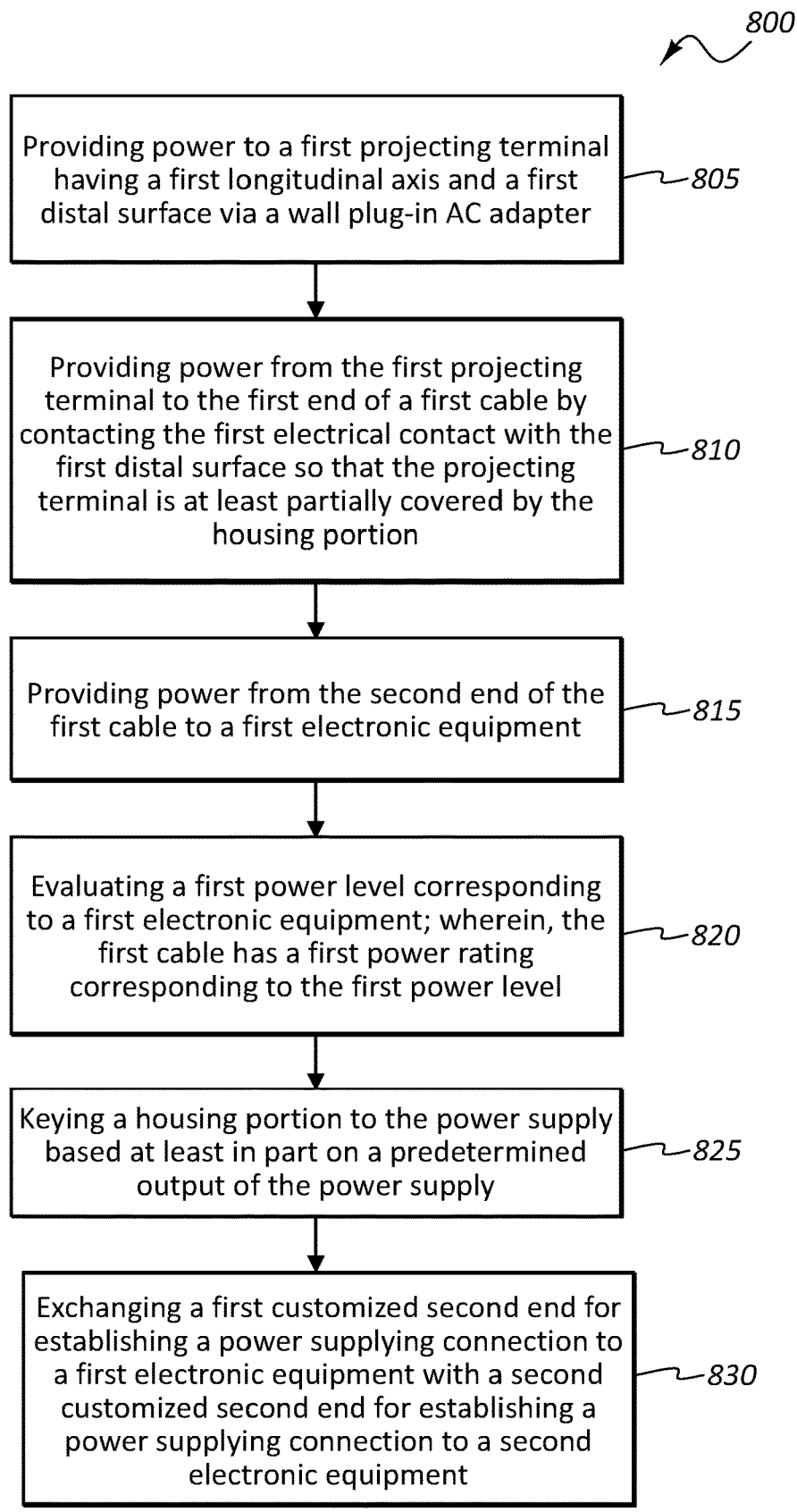
FIG. 8 is a flow chart illustrating an example of a method relating to a security, life safety, information technology, and/or an automation system in accordance with various aspects of this disclosure.

FIG. 8 is a flow chart illustrating an example of a method 800 for supplying power to security, life safety, information technology, and/or automation system components in accordance with various aspects of the present disclosure. For clarity, the method 800 is described below with reference to aspects of one or more of the power supply 105, 105-a, 105-b, 105-c, 105-d, 105-e described with reference to FIGS. 1-6, and/or aspects of one or more of the cable 130, 130-c, 130-d, 130-e, 130-f and cable 130-a, 130-b described with reference to FIGS. 1-6B, among others. In some examples, the method 800 may also involve using a first cable having a first end having a first electrical contact at least partially surrounded by a housing portion, and also having a second end.

At block 805, the method 800 may include providing power to a first projecting terminal having a first longitudinal axis and a first distal surface via a wall plug-in AC adapter. The operations at block 805 may be performed using the socket 405 of the wall 270-a as described in FIG. 4, the power supply 105, 105-a, 105-b, 105-c, 105-d, 105-e described with reference to FIGS. 1-6B, and the projecting terminal 215 described with reference to FIG. 2 among others.

At block 810, the method 800 may include providing power from the first projecting terminal to the first end of a first cable by contacting the first electrical contact with the first distal surface so that the projecting terminal is at least partially covered by the housing portion. The operations at block 810 may be performed using the cable 130, 130-c, 130-d, 130-e, 130-f, and cable 130-a, 130-b, described with reference to FIGS. 1-6B, and the first end 240, 240-a, 240-b, 240-c, 240-d of FIGS. 2, 4-6B among others.

At block 815, the method may also include providing power from the second end of the first cable to a first electronic equipment. The operations at block 815 may be performed using the power transmitting component 260, 260-a, 260-b, 260-c, 260-d, 260-e the second end 265, 265-a, 265-b described with reference to FIGS. 2, 4-6B and 9A-9B, the electronic device 210, 210-a 210-b of FIG. 2-4, the sensor units 110, 110-a of FIG. 2-3, the control panel 135, 135-a of FIGS. 1 and 3, and the cable 130, 130-c, 130-d, 130-e, 130-f, and the cable 130-a, 130-b described with reference to FIGS. 1-6B among others.

In addition, in some embodiments, at block 820, the method may include evaluating a first power level corresponding to a first electronic equipment, wherein the first cable has a first power rating corresponding to the first power level. In some examples, evaluating may include determining the allowable power input that may flow through the first electronic equipment without resulting damage. In different examples, such an allowable power input may be based on a maximum input in an instant, or a maximum over a period of time, and in some instances may account for a margin of safety. In some examples, evaluating a first power level corresponding to the first electronic equipment may include ascertaining the known power rating (s) of similar types of electronic equipment and comparing. In some examples, evaluating may include determining if the manufacturer of the first electronic equipment has set any power rating for the equipment. The operations at block 820 may be performed using the cable 130, 130-c, 130-d, 130-e, 130-f, and cable 130-a, 130-b, described with reference to FIGS. 1-6B, and the electronic device 210, 210-a 210-b of FIG. 2-4, the sensor units 110, 110-a of FIG. 2-3, and the control panel 135, 135-a of FIGS. 1 and 3.

At block 825, the method may include keying a housing portion to the power supply based at least in part on a predetermined output of the power supply. In some embodiments, for example, the housing portion may be keyed using a slot, a channel, or a combination thereof. In some embodiments, keying may also involve keying components on the power supply, as explained in further detail above. The keying may assist in preventing connection with an incompatible power supply. The operations at block 825 may be performed using, for example, the keying components 530 described with reference to FIG. 5 among others.

At block 830, the method may include substituting a first customized second end for establishing a power supplying connection to a first electronic equipment with a second customized second end for establishing a power supplying connection to a second electronic equipment. The operations at block 830 may be performed using the second end 265, 265-a, 265-b described with reference to FIGS. 2, 4-5, and the electronic device 210, 210-a 210-b of FIG. 2-4, the sensor units 110, 110-a of FIG. 2-3, and the control panel 135, 135-a of FIGS. 1 and 3 among others.

Thus, the method 800 may provide for supplying power to security, life safety, information technology, and/or automation system components. It should be noted that the method 800 is just one implementation and that the operations of the method 800 may be rearranged or otherwise modified such that other implementations are possible.

In some examples, aspects from two or more of the methods 700 and 800 may be combined and/or separated. It should be noted that the methods 700 and 800 are just example implementations, and that the operations of the methods 700 and 800 may be rearranged or otherwise modified such that other implementations are possible and contemplated in accordance with various aspects of this disclosure.

FIG. 9A shows a perspective view of an assembly 205-d relating to a security, life safety, information technology, and/or an automation system, in accordance with various aspects of this disclosure. The bracket assembly may plug into a wall receptacle 930. Wall receptacles (e.g., 930) may comprise one or more socket outlets (e.g., 940) for engaging with plugs (e.g., the plug of power supply 105-f that may include a wall adapter). To engage, plugs often have protruding features (e.g., prongs, blades 925, or pins) matching contact openings 945 (a.k.a., slots, holes) of the sockets 940. Screws or a screw 950 may often assist in securing a wall receptacle 930 in a fixed position in the wall.

Some power supplies 105-$f$ secure to receptacles (e.g., 930) so that the power supply plug is retained in an engaged position with a socket 940—i.e., so that the blades 925 of the power supply 105-$f$ are securely inserted into the contact openings 945 of a socket 940 (an "on" position). Some power supply enclosures and brackets 905 may accomplish this by inserting the tip and body, but not the head, of a screw 950 through an aperture 920 in the enclosure or bracket 905 and into a screw receiving unit 935 of the wall receptacle 930, and then tightening the screw 950. Because of the different orientations of different receptacles' screw receiving units in relation to sockets for varying designs, some brackets do not provide for easily and conveniently attaching to more than one receptacle type. For example, a power supply may be designed to work with standard wall receptacles 930 and sockets 940 but not Decora wall receptacles 960 and sockets 975 (shown in FIG. 9B).

In addition, presently available power supply brackets are not "universally" designed to satisfy both particular countries' (e.g., U.S. and foreign jurisdiction's) regulations. For example, the U.S. National Electrical Code (NEC) requires that power supplies for fire alarm systems be secured in the "on" position, yet Canadian law prohibits securing power supplies (i.e., wall adapters) to walls. This tension results in some features of power supply enclosures for securing to walls becoming obsolete when used in some foreign jurisdictions (such as Canada).

Standard wall receptacles 930 often feature two axially aligned sockets 940 with an axially aligned screw receiving unit 935 between the sockets 940 (into which the screw 950 removably inserts). On the other hand, Decora wall receptacles 960 (shown in FIG. 9B) may also have two axially aligned sockets 975 but two screw receiving units 965, each screw receiving unit 965 axially aligned above and below each socket 975. The distance between a standard wall receptacle screw receiving unit 935 and a socket 940 (FIG. 9A) is generally less than the distance between a Decora wall receptacle screw receiving unit 965 and a socket 975 (FIG. 9B). Although the distances between screw receiving units and sockets differ, such screw receiving units and sockets are similarly axially aligned for both standard and Decora wall receptacle types.

Thus, described here is a universal power supply retaining bracket (e.g., bracket 905) and/or assembly 205-$d$ that may fasten to more than one wall receptacle type. More particularly, in one embodiment, described herein is a bracket 905 for securing a wall power supply to standard wall receptacles 930 and Decora wall receptacles 960. These bracket embodiments—described in FIGS. 9A and 9B—may allow an axially aligned power supply plug and blades 925 thereof to engage with contact openings 945, 970 of sockets 940, 975 at different distances from screw receiving units 935, 965, thus allowing securing to different wall receptacles types, such as both a standard receptacle 930 and a Decora wall receptacle 960.

Relatedly, but more generally, described herein may be an assembly 205-$d$, which may be an example of a universal power supply assembly, for securing a power supply having plug blades 925 to both a first wall receptacle type and a second wall receptacle type. The assembly 205-$d$ may include a power supply 105-$f$, and a bracket 905 to secure the power supply 105-$f$ to the bracket 905 in at least one direction with the first wall receptacle type and the second wall receptacle type. The power supply 105-$f$ may be configured to fit within the bracket 905, or the bracket may be configured to fit around the power supply 105-$f$. The bracket 905 of the assembly 205-$d$ may further include an aperture 920 for adjusting the position of the plug blades 925 of the power supply 105-$f$ along an axis (e.g., a vertical axis), to obtain at least a first position and a second position.

While secure (e.g., vertically) in a first and/or a second position, the bracket 905 of the assembly 205-$d$ may also secure the power supply 105-$f$ to the bracket 905 in a different (e.g., horizontal) direction by an component, such as an arm or a loop 915, at least partially if not completely wrapping around the power supply 105-$f$. Thus, the presently described bracket 905 may prevent horizontally-backward movement by a component, such as an arm or a loop 915, wrapping around the outside of the power supply 105-$f$ and by the bracket 905 screwing into the wall receptacle 930 through the screw receiving unit 935.

Moreover, bracket 905 embodiments may achieve this restriction of movement at different axial (e.g., vertical) coordinates of the secured power supply 105-$f$. For example, in some embodiments, the aperture 920 for adjusting the position of the power supply 105-$f$ may include an axially aligned track 910 for moving the power supply plug blades 925 along the axis of the sockets (e.g., 940, 975) to obtain the first position or the second position.

In addition, the presently described bracket embodiment 905 may allow for engagement of the cable 130-$g$ from the bottom direction (e.g., the first end 240-$e$ connecting to the bottom end of the power supply 105-$f$) so that a user does not have to remove the power supply 105-$f$ in order to connect a power transmitting component 260-$d$ of the cable 130-$g$ and/or a device.

Unlike the typical box style power supply enclosure (which may shield a power supply from view), the described bracket embodiment's 905 loop 915 wrapping around the visible power supply 105-$f$ may serve as a visual indicator that the power supply 105-$f$ should not be unplugged from the wall receptacle 930, 960. Furthermore, some embodiments of the power supply 105-$f$ and bracket 905 may have rounded edges, to prevent catching of wires, and or unwanted interaction with a user, thereby reducing risk of snagging and/or inadvertent contact.

Moreover, because the described bracket embodiment 905 may be easily removable from the power supply 105-$f$, the power supply 105-$f$ may detach and be used by itself as a stand-alone unit, so as to not suggest that the power supply 105-$f$ must be secured (especially in jurisdictions where securing to a wall is prohibited).

In addition, variations on and alternatives to screws and screw receiving units are contemplated without departing from the scope and spirit of this disclosure. For example, in some instances, wall receptacles (e.g., Standard and/or Decora, etc.) may not have any screw receiving units (i.e., "screwless" cover plates). In such examples, a bracket as disclosed herein may still connect or secure to the receptacle using one or more alternatives. For instance, in some embodiments, the bracket may attach to, connect to, interact with, or couple to the receptacle based on an adhesive (e.g., double-sided adhesive tape), instead of or in addition to a screw (as described above with reference to FIGS. 9A and 9B) to assist in securing the power supply bracket to a receptacle and/or the cover plate.

In some embodiments, adhesive may be placed on and/or line one or more sides or surfaces of a bracket (e.g., bracket 905) configured to face and contact at least some of the exterior surface of the wall receptacle and/or cover plate.

The adhesive, in some embodiments, may be configured to form a sufficiently strong bond with the material (e.g., plastic, metal) of the outer surface of the wall receptacle, to support the weight of the bracket and wall plug-in AC adapter and/or the weight (or at least a portion of the weight) of a cable (such as the cable embodiments described herein) or other components, for an extended period of time. In some embodiments, installation may involve removing a plastic cover film from the adhesive prior to installation. In some embodiments, the bracket may easily be removed from the wall receptacle by applying sufficient force in one or more directions. In some embodiments, the bracket and/or the related adhesive may prevent movement in one or more directions (e.g., vertically, some combination) and/or permit movement in one or more different directions (e.g., horizontally, some combination). In some embodiments, the bracket, a screw, and/or the related adhesive may prevent movement in one or more directions (e.g., vertically, horizontally, diagonally, some other combination). In some embodiments, using some form of an adhesive (e.g., double sided tape, glue, putty, etc.) instead of a screw and a screw receiving unit to secure the bracket to the wall receptacle like the examples described, will not affect the other features of the bracket for universally fitting more than one type of wall receptacle, such as an axially aligned track mentioned above.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. An assembly for supplying power to security, life safety, information technology, and/or automation system components, comprising:
   a power supply comprising:
      at least one prong for plugging into a wall;
      a first screw terminal distinct from the at least one prong, the first screw terminal having a first longitudinal axis and a first distal surface; and
      a second screw terminal distinct from the at least one prong, the second screw terminal having a second longitudinal axis and a second distal surface;
   a first cable comprising:
      a first end of the first cable configured to electrically connect the first cable to the power supply;
      a first electrical contact of the first cable that is at least partially surrounded by a housing portion of the first end of the first cable, the first electrical contact having a first electrical contact surface to contact the first distal surface of the first screw terminal;
      a first spring of the first cable coupled to the first electrical contact, wherein the first electrical contact surface is configured to adjust along the first longitudinal axis of the first screw terminal based at least in part on the first spring; and
      a second electrical contact of the first cable that is at least partially surrounded by the housing portion of the first end of the first cable;
   wherein the first distal surface of the first screw terminal establishes a positively charged connection between the power supply and the first end of the first cable by connecting the first electrical contact surface to the first distal surface, and
   wherein the second distal surface of the second screw terminal establishes a negatively charged connection between the power supply and the first end of the first cable by connecting the second electrical contact surface contacting the second distal surface.

2. The assembly of claim 1, wherein the first electrical contact comprises:
   the first spring in the housing portion.

3. The assembly of claim 1, wherein the first cable further comprises:
   a second end to connect to an electrical device.

4. The assembly of claim 3, wherein the second end comprises:
   a removable connector.

5. The assembly of claim 1, wherein the housing portion is keyed to the power supply based at least in part on a first predetermined output of the power supply.

6. The assembly of claim 5, wherein the housing portion is keyed by any of a slot, or a channel, or a combination thereof.

7. The assembly of claim 1, wherein the power supply is keyed to the housing portion based at least in part on a first predetermined output of the power supply.

8. The assembly of claim 1, further comprising:
   a second cable having a second characteristic and a housing portion that at least partially surrounds an electrical contact surface for contacting the first distal surface,
   wherein the first cable has a first characteristic different from the second characteristic, and
   wherein the first characteristic and the second characteristic comprise cable length, a wire gauge, a connector shape, a wire end, a current rating, or any combination thereof.

9. The assembly of claim 1, wherein the second electrical contact comprises:
   a second spring within the housing portion.

10. The assembly of claim 1, wherein the power supply comprises:
    a wall plug-in AC adapter.

11. The assembly of claim 1, wherein the first screw terminal adjusts along the first longitudinal axis and the second screw terminal adjusts along the second longitudinal axis.

12. The assembly of claim 1, wherein the second electrical contact surface adjusts along the second longitudinal axis of the second screw terminal based at least in part on a second spring of the first cable.

13. The assembly of claim 1, wherein the first distal surface biases the first electrical contact surface, and the second distal surface biases the second electrical contact surface.

14. The assembly of claim 1, wherein the first electrical contact surface adjusts in multiple directions.

15. The assembly of claim 1, wherein the first distal surface and the second distal surface each comprise a non-planar surface or a convex surface, and wherein the first electrical contact surface and the second electrical contact surface each comprise a non-planar surface or a concave surface.

16. A method for supplying power to security, life safety, information technology, and/or automation system components using a first cable having a first end having a first electrical contact at least partially surrounded by a housing portion, and also having a second end, the method comprising:
providing power to a first screw terminal having a first longitudinal axis and a first distal surface via a wall plug-in AC adapter comprising at least one prong for plugging into the wall, wherein the first screw terminal is distinct from the at least one prong;
providing power from the first screw terminal to the first end of the first cable by contacting the first electrical contact with the first distal surface so that the first screw terminal is at least partially covered by the housing portion, the first end of the first cable comprising a first spring coupled to the first electrical contact, wherein a surface of the first electrical contact adjusts along the first longitudinal axis of the first screw terminal based at least in part on the first spring;
providing power from the second end of the first cable to a first electronic equipment.

17. The method of claim 16, further comprising:
evaluating a first power level corresponding to a first electronic equipment; wherein, the first cable has a first power rating corresponding to the first power level.

18. A cable for supplying power to security, life safety, information technology, and/or automation system components using a power supply having a first screw terminal, the first screw terminal having a first longitudinal axis and a first distal surface, the cable comprising:
a first end having a housing portion that at least partially surrounds a first electrical contact having a first electrical contact surface to contact the first distal surface so that the first screw terminal is at least partially covered by the housing portion, the first end comprising a first spring coupled to the first electrical contact, wherein the first electrical contact surface is configured to adjust along the first longitudinal axis of the first screw terminal based at least in part on the first spring;
and a second end for establishing a power supplying connection to a first electronic equipment.

19. The cable of 18, wherein the first electrical contact comprises:
the first spring in the housing portion.

* * * * *